United States Patent Office 3,686,255
Patented Aug. 22, 1972

3,686,255
CERTAIN SUBSTITUTED CYCLOHEXYL ISO-
CYANATES AND THIOISOCYANATES
Richard N. Knowles, P.O. Box 302, R.D. 1,
Mill Creek Road, Hockessin, Del. 19707
No Drawing. Application Apr. 20, 1967, Ser. No. 635,307,
which is a continuation-in-part of application Ser. No.
574,499, Aug. 18, 1966. Divided and this application
Nov. 13, 1968, Ser. No. 775,563
Int. Cl. C07c *119/00, 119/04*
U.S. Cl. 260—453 A
11 Claims

ABSTRACT OF THE DISCLOSURE

Intermediate compounds of the formula:

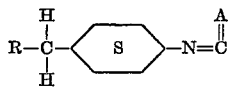

wherein
A is oxygen or sulfur,
R is alkyl, cycloalkyl, cycloalkylalkyl, bicycloalkyl or tricycloalkyl.

Typical is 4 - cyclohexylmethylcyclohexylisothiocyanate useful as an intermediate to make animal repellant compounds.

CROSS REFERENCE

This application is a divisional of my copending application Ser. No. 635,307, filed Apr. 20, 1967 which in turn is a continuation-in-part of my application Ser. No. 574,499, filed Aug. 18, 1966.

BACKGROUND OF THE INVENTION

United States Patent application Ser. No. 532,544, filed Mar. 1, 1966, now abandoned, discloses cyclohexyl compounds which are useful animal repellants. I have now discovered another class of compounds containing cyclohexyl ring structures which are also useful animal repellants.

SUMMARY OF THE INVENTION

This invention relates to substituted cyclohexylureas. More specifically this invention refers to 1-aryl-3-(4-higher alkyl substituted cyclohexyl)ureas and thioureas, compositions containing them and methods of applying them to animals.

Potent animal inhalation irritant effects are achieved by applying to animals or their habitat, compounds of the formula:

(1)

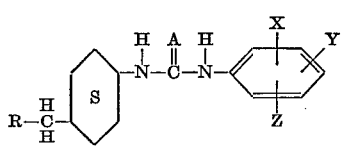

wherein

A is oxygen or sulfur;
R is alkyl of 3 through 8 carbon atoms, cycloalkyl of 4 through 9 carbon atoms, cycloalkylalkyl of 5 through 10 carbon atoms, bicycloalkyl of 7 through 10 carbon atoms, or tricycloalkyl of 10 through 11 carbon atoms;
X, Y and Z can be the same or different and are hydrogen, halogen, nitro, alkyl of 1 through 3 carbon atoms, trifluoromethyl, cyano or alkoxy of 1 through 3 carbon atoms.

Substitution on the cyclohexyl ring must be in the cis configuration to obtain optimum irritant effects.

Most preferred because of high irritant effects at a low use rate is 1-phenyl-3-(cis 4-cyclohexylmethylcyclohexyl) urea.

Utility

Compounds of this invention cause potent irritation to animal tissue, particularly to the mucous membranes.

Animals exposed to the above compounds show signs of severe respiratory irritation and are quickly incapacitated. These compounds have two advantages over currently used riot control agents such as ortho-chlorobenzylidenemalonitrile (CS) and 2 - chloroacetophenone (CN). One, the compounds are more potent at low concentrations and two, provide residual activity over longer periods of time.

Compounds of this invention and particularly 1-phenyl-3-(cis-4-cyclohexylmethylcyclohexyl)urea have potential use as riot control agents, dog repellants, deer repellants, rodent repellants and for contaminating caves or underground tunnels.

Preparation

The compounds of this invention can be prepared by several different synthesis routes which are illustrated below.

R, A, X, Y and Z in the below equations are as defined above in Formula 1.

I

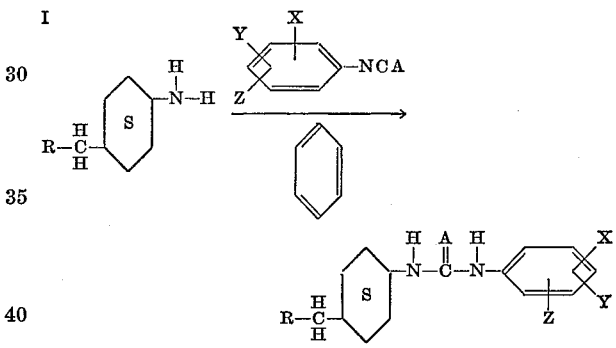

The amine and isocyanate are carefully mixed into stirring benzene. The solution is then refluxed for several hours to insure completion of the reaction. Since isocyanates react with water, the reaction system must be kept dry. The benzene is then evaporated in vacuum and the residual ureas are purified by recrystalliaztion.

Depending on the method of synthesis of the starting amine, the cis:trans ratio of the urea product ranges from 1:3 to 3:1. The isomer mixture can be used as an irritant without separation of the isomers.

Synthesis Route B

II

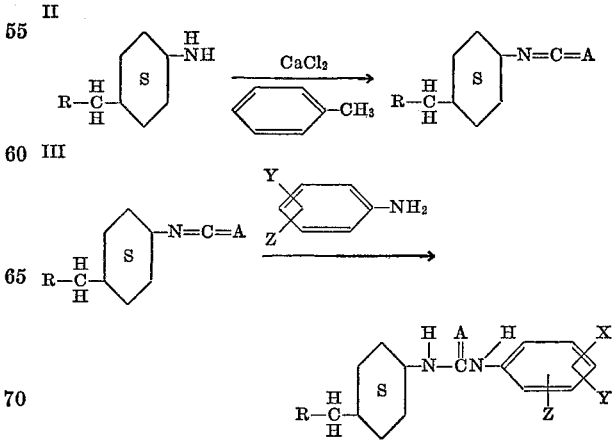

The preparation of the isocyanates or isothiocyanates of reaction II is performed by the addition of the desired amine to a cold toluene solution containing a 10% excess of phosgene or thiophosgene. The carbamyl or thiocarbamyl chloride complex precipitates. The stirring slurry is slowly heated to reflux; reflux is continued until the slurry completely dissolves, and no more hydrogen chloride gas is evolved. The intermediate isocyanate or isothiocyanate can be isolated by distillation, or used, as is, in the toluene solution after its concentration has been determined.

The procedure for reaction III is similar to that for reaction I above.

The compounds of this invention are white crystalline materials which are easily purified by recrystallization from conventional solvents. If desired, the cis and trans isomers can be separated by chromatography over silicic acid using chloroform as eluent. The ratio of silicic acid to compound is 50:1.

Cyclohexylamine intermediates

The cyclohexylamine intermediates used for the preparation of the compounds of Formula 1 are prepared by the following synthesis routes. R is as defined in Formula 1.

IV 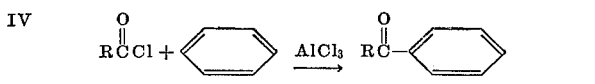

V 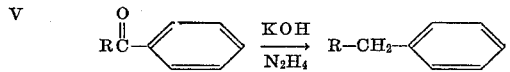

VI 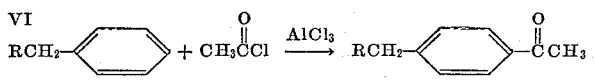

VII 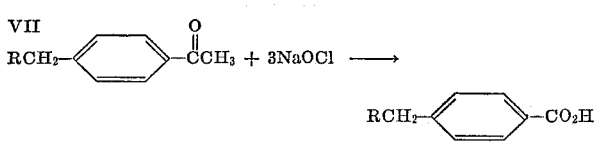

VIII 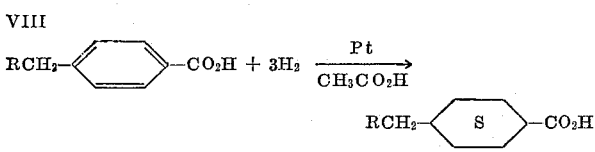

IX 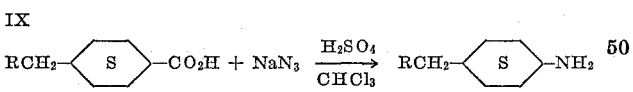

The Friedel-Crafts reaction (IV) is run by carefully adding the acid chloride to a stirring mixture of aluminum chloride and benzene. A slight molar excess of catalyst is used; benzene serves as both a solvent and reactant. The acid chloride is added at a rate sufficient to keep the temperature of the slurry at about 30–40° C. The mixture is stirred for one additional hour after all of the acid chloride is added, and then water is slowly added to decompose the catalyst. Sufficient water is added so that all the solids are dissolved. The phenylalkyl ketone is isolated from the benzene solution and is purified by distillation.

The Wolff-Kishner reduction (V) is run in 2-(2-ethoxyethoxy)ethanol using a modification of the procedure given by J. Cason, et al. in Organic Synthesis Collective vol. IV, John Wiley and Sons, New York, (1963), p. 510. Once the reactants are mixed, they are heated to reflux for a period of three to five hours. The reflux temperature is generally in the 130–140° C. range. After completion of the reflux period, the solution is cooled and poured into three to four volumes of water. The alkylbenzene product is extracted with pentane and purified by distillation.

The Friedel-Crafts reaction (VI) is run by mixing approximately equimolar quantities of the reactants together in hexane or nitromethane at less than 5° C. The stirring mixture is slowly allowed to warm to room temperature, and after hydrogen chloride evolution subsides, the mixture is refluxed several hours. Water is then added slowly to decompose the catalyst. A sufficient quantity of water is then added so that all of the solids are dissolved. The desired acetophenone derivative is isolated from the organic phase, and purified by distillation. Gas-liquid chromatography on an F & M Model 500 Gas Chromatographer using a 2′ x ¼″ O.D. stainless steel column, containing 10% Carbowax 20M on 60–80 mesh Diatoport T indicates that about 98% of the acetophenone is the 1,4 isomer and 2% is the 1,2 isomer. The 1,2 isomer has the shorter retention time.

The haloform reaction (VII) is run by slowly adding a cold (<5° C.) sodium hypochlorite solution to a stirring solution of the acetophenone derivative in methanol. This is a modification of the procedure used by E. E. Royals (J. Am. Chem. Soc., 69, 841 (1947)) for the haloform reaction of α-ionone. After the sodium hypochlorite solution is added, the mixture is warmed to room temperature, and left standing over-night. Thereafter, the mixture is heated to reflux, and the distillate collected until the pot temperature rises to 95–97° C.; most of the methanol is distilled. The pot is then cooled to room temperature. In those reactions where R has a low molecular weight radical such as butyl, the sodium benzoate derivative remains dissolved; however, if R is a high molecular weight radical such as octyl, the sodium benzoate derivative precipitates as a soapy solid. Sulfur dioxide is bubbled into the alkaline pot concentrate until the pH drops below 3. The precipitated benzoic acid derivative is either filtered and washed with water, or extracted with methylene chloride depending on whether or not the benzoic acid is easily filterable or is of a soapy nature. Some of these benzoic acid derivatives can be recrystallized from acetonitrile or pentane, and some are purified merely by trituration with cold pentane.

The catalytic hydrogenation (VIII) is performed at two to three atmospheres of hydrogen using platinum oxide as catalyst and glacial acetic acid as solvent. A Parr Hydrogenation Apparatus is suitable for these reactions. This reaction produces a cis/trans isomer mixture of about 2 or 3/1. The cis and trans designation refers to the relationship of the 4-alkyl substituent and carboxylic acid group on the cyclohexane ring, this is illustrated below

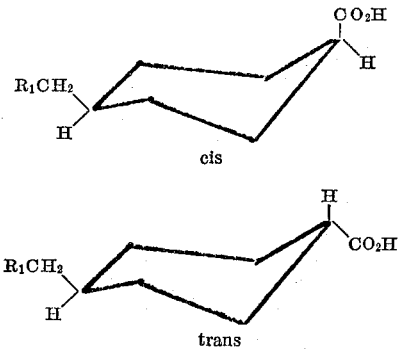

The Schmidt reaction (IX) is performed by dissolving the cyclohexane carboxylic acid derivative in a mixture of chloroform and concentrated sulfuric acid. Sodium azide is then added in small portions to the stirring mixture at a rate sufficient to keep the reaction temperature between 35 and 45° C. The mixture is stirred at about 45 to 50° C. until the bubbling nearly stops (1 to 3 hours). The mixture is then transferred to a separatory funnel, and the lower, gelatinous sulfuric acid, layer is slowly dripped onto ice. The amine sulfate precipitates as a soapy material which slowly crystallizes. The chloroform should be kept away from the ice water mixture since it makes the work-up much more difficult. Those amines which crystallize as the hemi-sulfates or sulfates are filtered and washed with water. It is convenient to store these amines as their salts. Those amine salts which fail to crystallize are converted to the free bases by making the sulfuric acid solution alkaline, and extracting the amine with dichloromethane. The amine is then purified by distillation. The Schmidt reaction proceeds without changing the cis/trans product ratio.

An alternative synthesis route for these amines can be used when the appropriately substituted aniline derivatives are available. This route is illustrated below.

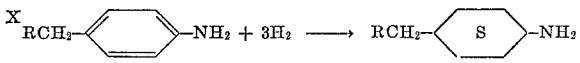

The hydrogenation (X) can be performed on a Parr Hydrogenation Apparatus using platinum oxide as catalyst and glacial acetic acid as solvent. The cis/trans ratio of the cyclohexylamine product is about 1:1.

Compositions

Compounds of this invention can be administered alone, but are generally contained in a composition with an inert diluent nontoxic to animals. The diluent selected depends on the route of administration.

Emulsifying agents can be used with the diluent and compound of Formula I to aid in dispersion of the active ingredient. Emulsifying agents that could be used include alkylaryl polyethoxy alcohols, alkyl and alkylaryl polyether alcohols, polyoxyethylene sorbitol or sorbitan fatty esters, polyethylene glycol fatty esters, fatty alkylol amide condensates, amine salts of fatty alcohol sulfates plus long chain alcohols and oil soluble petroleum sulfonates.

The amount of emulsifying agent in the composition will range from 0.1 to 20% by weight.

Since the compounds of the present invention would generally be administered by vapor or spray application, the compositions will contain a liquid diluent such as water, acetone, hexane, gasoline, kerosene, other hydrocarbon oils, alcohols or other liquids generally used in pharmaceutical preparations.

The amount of active ingredient in the composition will vary from 0.005% by weight to 95% or even higher. However, the diluent will generally constitute the major proportion of the composition and the amount of active ingredient will be less than 50% by weight. The exact concentration of the active ingredient will depend on the mechanism used for administration and will be easily understood by one knowledgeable in pharmaceutical application rates.

Application

A quantity of active ingredient sufficient to cause irritation to animal tissue is 50 to 4000 micrograms per liter of air at exposure of one minute. A quantity of 100 to 4000 micrograms per liter of air at exposure of one minute is preferred. Rates of over 6000 micrograms per liter of air at exposure of one minute kills 50% of the mice which are treated.

The following additional examples are provided to more clearly illustrate the invention.

Example 1

A solution of 18 grams (0.15 mole) of phenylisocyanate in 200 milliliters of benzene is treated with stirring with 30 grams (0.15 mole) of 4-cyclohexylmethylcyclohexylamine. The reactants are refluxed for 3 hours, and then the benzene is evaporated in vacuum. The crystalline residue is recrystallized from acetonitrile giving pure 1-phenyl-3-(4-cyclohexylmethylcyclohexyl)urea as white crystals, M.P. 144–146° C.

Calc'd for $C_{20}H_{30}N_2O$ (percent): C, 76.4; H, 9.6; N, 8.9. Found (percent): C, 76.8; H, 9.6; N, 9.0.

Mice are treated by aerosol exposure to the 1-phenyl-3-(4-cyclohexylmethylcyclohexyl)urea in the following manner: The compound is administered as an aerosol into a 2.8 liter chamber. The exposure chamber consists of a 2.8 liter bell jar over a nebullizer inserted through the floor of the chamber. Mice are exposed for 5 minutes to 200.0 micrograms per liter (1,000 Ct). The compound is dissolved in 1.4 ml. of acetone and during a span of 20 seconds the compound is sprayed up into the chamber. No further air is transferred into or out of the chamber during the five minute exposure.

After this exposure, irritant effects are observed in all mice exposed. The mice used as control exposed to 1.4 ml. of acetone exhibit no irritant effects. Irritant effects can be described as the presence of one or more of the following reactive signs:

(a) hyperemia of the ears, nose and tail
(b) abnormal gait, including rubbing of the nose on the floor while running about
(c) blinking
(d) salivation
(e) depression
(f) dyspnea
(g) hunched posture Examples 2–23

The following compounds are made in the manner of the 1-phenyl-3-(4-cyclohexylmethylcyclohexyl)urea of Example 1 by substituting like molar amounts of the appropriate isocyanate and amine starting materials. The compounds are formulated and applied in like manner to provide like results.

(2) 1-p-chlorophenyl-3-(4-cyclopentylmethylcyclohexyl)urea.
(3) 1-m-nitrophenyl-3-(4-n-hexylcyclohexyl)urea.
(4) 1-m-trifluoromethylphenyl-3-(4-n-butylcyclohexyl)urea.
(5) 1-p-nitrophenyl-3-(4-cyclooctylmethylcyclohexyl)urea.
(6) 1,3-nitro-4-chlorophenyl-3-(4-cyclohexylmethylcyclohexyl)thiourea.
(7) 1-p-tolyl-3-(4-n-nonylcyclohexyl)urea.
(8) 1-m-ethylphenyl-3-(4-(5-ethyloctyl)cyclohexyl)urea.
(9) 1-p-methoxyphenyl-3-(4-cycloheptylmethylcyclohexyl)urea.
(10) 1-p-propoxyphenyl-3-(4-n-pentylcyclohexyl)thiourea.
(11) 1-p-cyanophenyl-3-(4-cyclobutylmethylcyclohexyl)urea.
(12) 1-o-chlorophenyl-3-(4-iso-butylcyclohexyl)urea.
(13) 1-phenyl-3-(4-n-butylcyclohexyl)urea.
(14) 1-phenyl-3-(4-cyclohexylmethylcyclohexyl)thiourea.
(15) 1-p-cumyl-3-(4-n-decylhexyl)urea.
(16) 1-(3,4-dimethoxyphenyl)-3-(4-cyclononylmethylcyclohexyl)urea.
(17) 1-phenyl-3-(4-(2-[2.2.1]-bicycloheptylmethyl)cyclohexyl)urea.
(18) 1-phenyl-3-(4-(2-[3.3.1]-bicyclononylmethyl)cyclohexyl)urea.
(19) 1-phenyl-3-(4-(2-methylpentyl)cyclohexyl)urea.
(20) 1-phenyl-3-(4-(3-cyclopentylpropyl)cyclohexyl)urea.
(21) 1-phenyl-3-(4-(1-adamantylmethyl)cyclohexyl)urea.
(22) 1-phenyl-3-(4-(1-homoadamantylmethyl)cyclohexyl)urea.

Example 23

Thiophosgene (13 grams; 0.11 mole) is added to 100 milliliters of toluene at 10° C. This cold solution is then treated with 4-cyclohexylmethylcyclohexylamine (19.5 grams; 0.1 mole). The thiocarbamyl chloride complex precipitates. The stirring slurry is gradually heated to reflux and reflux is confined until no more hydrogen chloride gas is evolved. The toluene is distilled off, and the residual 4-cyclohexylmethylcyclohexylisothiocyanate is distilled at 116° C. at 0.3 millimeter of mercury.

Calc'd for $C_{14}H_{23}NS$ (percent): C, 70.9; H, 9.8; N, 5.9; S, 13.5. Mol. wt. 237.44. Found (percent): C, 70.8; H, 9.6; N, 6.1; S, 13.6. Mol. wt. 238.

The 4 - cyclohexylmethylcyclohexylisothiocyanate cis and trans isomers have retention times of 30.7 and 34.7 minutes respectively analyzed on an F & M Model 500 Gas Chromatograph using a 2' x ¼" O.D. stainless steel column containing 10% Carbowax 20M on 60–80 mesh Diatoport T at a column temperature of 215° C., a block temperature of 340° C., an injection port temperature of 290° C., and a He flow rate of 60 cc./min. The cis:trans ratio ranges from 1:3 to 3:1 depending on the method of synthesis of the 4-cyclohexylmethylcyclohexylamine.

Examples 24–45

The following isothiocyanates and isocyanates used in synthesizing the animal repellant ureas are prepared according to the procedure given for 4 - cyclohexylmethylcyclohexylisothiocyanate in Example 23 by substituting like molar amounts of the appropriate amines for the 4-cyclohexylmethylcyclohexylamine of Example 23 and phosgene for the thiophosgene where isocyanates are desired.

(24) 4-cyclohexylmethylcyclohexylisocyanate.
(25) 4-cyclobutylmethylcyclohexylisocyanate.
(26) 4-cyclononylmethylcyclohexylisothiocyanate.
(27) 4-cyclopentylmethylcyclohexylisocyanate.
(28) 4-cycloheptylmethylcyclohexylisocyanate.
(29) 4-n-butylcyclohexylisocyanate.
(30) 4-n-hexylcyclohexylisocyanate.
(31) 4-iso-butylcyclohexylisocyanate.
(32) 4-(2-methylpentyl)cyclohexylisothiocyanate.
(33) 4-n-heptylcyclohexylisocyanate.
(34) 4-n-Octylcyclohexylisothiocyanate.
(35) 4-cyclooctylmethylcyclohexylisocyanate.
(36) 4-n-nonylcyclohexylisocyanate.
(37) 4-(3-cyclopentylpropyl)cyclohexylisocyanate.
(38) 4-(3-cyclopentylpropyl)cyclohexylisothiocyanate.
(39) 4-(2-[2.2.1]-bicycloheptylmethyl)cyclohexylisocyanate.
(40) 4-(2-[3.2.0]-bicycloheptylmethyl)cyclohexylisocyanate.
(41) 4-(2-[3.2.1]-bicyclooctylmethyl)cyclohexylisocyanate.
(42) 4-(2-[3.3.1]-bicyclononylmethyl)cyclohexylisocyanate.
(43) 4-(1-adamantylmethyl)cyclohexylisocyanate.
(44) 4-(1-adamantylmethyl)cyclohexylisothiocyanate.
(45) 4-(1-homoadamantylmethyl)cyclohexylisocyanate.

Example 46

Dogs are exposed to 1-phenyl-3-(4-cyclohexylmethylcyclohexyl)urea spotted on a 6 cm. circle of filter paper. The dog's head is held by an operator, and the dried paper is shaken 6 to 12 cm. from the muzzle. Within 10–30 seconds, the dog salivates, licks his lips, and occasionally face-paws. Generally he struggles to escape further irritant effects. As little as five milligrams on paper is sufficient to cause visible discomfort in most dogs.

Example 47

A test chamber, comprising a plastic rectangular box of 65 liters, is filled with an aerosol spray of 1-phenyl-3-(4-cyclohexylmethylcyclohexyl)urea. The spray is administered 2 cm. above an immobilized rabbit, and 3 cm. distant from the end of the nose. The aerosol is aimed directly at the rabbit. Administration of compound takes approximately one minute. At 5,000 Ct. (5 minutes), the rabbit exhibited lacrimation, nasal exudate, face pawing, and constant head shaking. After several minutes, the eyes became static after periods of blinking. Dyspnea continued for two hours after exposure.

I claim:

1. A compound of the formula:

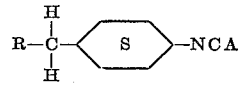

wherein
A is selected from the group consisting of oxygen and sulfur; and
R is selected from the group consisting of alkyl of 3 through 8 carbon atoms, cycloalkyl of 4 through 9 carbon atoms, cycloalkylalkyl of 5 through 10 carbon atoms, bicycloalkyl of 7 through 10 carbon atoms, and tricycloalkyl of 10 through 11 carbon atoms.

2. A compound according to claim 1 wherein R is alkyl of 3 through 8 carbon atoms.

3. A compound according to claim 1 wherein R is cycloalkyl of 4 through 9 carbon atoms.

4. A compound according to claim 1 wherein R is cyclohexyl.

5. A compound according to claim 1 wherein R is cycloalkylalkyl of 5 through 10 carbon atoms.

6. A compound according to claim 1 wherein R is bicycloalkyl of 7 through 10 carbon atoms.

7. A compound according to claim 1 wherein R is tricycloalkyl of 10 through 11 carbon atoms.

8. A compound according to claim 1 wherein A is oxygen.

9. A compound according to claim 1 wherein A is sulfur.

10. 4-cyclohexylmethylcyclohexylisothiocyanate.
11. 4-cyclohexylmethylcyclohexylisocyanate.

References Cited

UNITED STATES PATENTS 3,330,850   7/1967   Campbell et al. ____ 260—453 A

LELAND A. SEBASTIAN, Primary Examiner

U.S. Cl. X.R.

260—453 AP, 454; 424—322